(12) United States Patent  
French et al.

(10) Patent No.: US 9,213,573 B2  
(45) Date of Patent: Dec. 15, 2015

(54) MANAGEMENT OF PRIORITIZING VIRTUAL MACHINES IN AN OPERATING ENVIRONMENT

(71) Applicant: International Business Machines Corporation, Armonk, NY (US)

(72) Inventors: Paul B. French, Cork (IE); Niall J. Lucey, Carrigadrohid (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/476,019

(22) Filed: Sep. 3, 2014

(65) Prior Publication Data

US 2015/0052528 A1 Feb. 19, 2015

Related U.S. Application Data

(63) Continuation of application No. 13/965,293, filed on Aug. 13, 2013.

(51) Int. Cl.
*G06F 9/455* (2006.01)
*G06F 9/48* (2006.01)
*G06F 9/50* (2006.01)

(52) U.S. Cl.
CPC .......... *G06F 9/4856* (2013.01); *G06F 9/45533* (2013.01); *G06F 9/45558* (2013.01); *G06F 9/5083* (2013.01); *G06F 9/5088* (2013.01); *G06F 2009/4557* (2013.01)

(58) Field of Classification Search
None
See application file for complete search history.

(56) References Cited

U.S. PATENT DOCUMENTS

| | | | |
|---|---|---|---|
| 8,117,613 B2 | 2/2012 | Uyeda | |
| 8,166,176 B2 * | 4/2012 | Kumar et al. | 709/227 |
| 8,332,847 B1 | 12/2012 | Hyser et al. | |
| 8,341,626 B1 | 12/2012 | Gardner et al. | |
| 2002/0198991 A1 * | 12/2002 | Gopalakrishnan et al. | 709/225 |

(Continued)

FOREIGN PATENT DOCUMENTS

WO 2013019185 A1 2/2013

OTHER PUBLICATIONS

Anonymous, "A Resource Score Based Method to Provision Virtual Machines in a Cloud System" IP.com Prior Art Database Technical Disclosure, Jul. 25, 2012. IP.com No. IPCOM00220185D. http://ip.com/IPCOM/000220185.

(Continued)

*Primary Examiner* — Qing Wu
*Assistant Examiner* — Bruce S Ashley
(74) *Attorney, Agent, or Firm* — Jonathan V. Sry; Steven Chiu

(57) ABSTRACT

Embodiments directed toward a method, system, and computer program product for placement of a plurality of virtual machines on a hardware resource are provided. The method can also include generating a user location vector for each candidate virtual machine from the plurality of candidate virtual machines by aggregating a plurality of user location metrics for each candidate virtual machine. The method can also include ranking, in response to a performance resource demanded by the plurality of candidate virtual machines being at or above a threshold of the performance resource available on the hardware resource, the candidate virtual machines as a function of an aggregate user location vector for each candidate virtual machine. The method can include selecting a subset of the candidate virtual machines for migration based on the ranking.

5 Claims, 11 Drawing Sheets

(56) References Cited

U.S. PATENT DOCUMENTS

| | | | |
|---|---|---|---|
| 2007/0271560 A1 | 11/2007 | Wahlert et al. | |
| 2008/0102835 A1* | 5/2008 | Zhao et al. | 455/436 |
| 2009/0228589 A1 | 9/2009 | Korupolu | |
| 2011/0107332 A1 | 5/2011 | Bash | |
| 2011/0225277 A1 | 9/2011 | Freimuth et al. | |
| 2012/0023223 A1* | 1/2012 | Branch et al. | 709/224 |
| 2012/0089726 A1* | 4/2012 | Doddavula | 709/224 |
| 2012/0266163 A1 | 10/2012 | Durham et al. | |
| 2012/0290643 A1* | 11/2012 | Fok Ah Chuen et al. | 709/203 |
| 2013/0318521 A1* | 11/2013 | Monaghan et al. | 718/1 |

OTHER PUBLICATIONS

Arzuaga, E., "Using Live Virtual Machine Migration to Improve Resource Efficiency on Virtualized Data Centers", Computer Engineering Dissertations, Jan. 1, 2012, Department of Electrical and Computer Engineering, Northeastern University, © Copyright 2012 by Emmanuel Arzuaga.

IBM, "Means to Over-Ride Automatic Placement Algorithms in a Cloud Computing Provisioning Solution", IP.com Prior Art Database Technical Disclosure, Sep. 22, 2009. IP.com No. IPCOM000188075D. http://ip.com/IPCOM/000188075.

Mell et al., "The NIST Definition of Cloud Computing", National Institute of Standards and Technology, NIST Special Publication 800-145, Sep. 2011, Gaithersburg, MD.

Murphy, A., "Geo-location: Adding Context to Virtual Machine Mobility", Internet Telephony Magazine, TMC.net, Jul. 1, 2011. http://www.tmcnet.com/voip/columns/articles/206720-geo-location-adding-context-virtual-machine-mobility.htm?subscribed=true.

French et al., "Management of Prioritizing Virtual Machines in an Operating Environment", U.S. Appl. No. 13/965,293, filed Aug. 13, 2013.

* cited by examiner

MANAGEMENT OF PRIORITIZING VIRTUAL MACHINES IN AN OPERATING ENVIRONMENT

TECHNICAL FIELD

This disclosure generally relates to the field of information processing systems, and more particularly relates to managing the placement of virtual machines on a network.

BACKGROUND

Virtual machines (abbreviated VM herein) may help to more efficiently use physical processing resources by allowing one computer system to support functions normally performed by multiple separate computer systems. By virtualizing a hardware resource in a cloud-based network, a single hardware resource may support multiple virtual machines in a flexible manner that provides improved utilization of the processing resource. Further, if a physical processing resource in a cloud-based network becomes over-utilized, virtual machines may migrate to other physical processing resources of the cloud-based network that may have processing capacity.

In parallel, pervasive devices have become part of everyday life. While their main purpose is to enable voice communication, new features are transforming cell phones into multipurpose devices. With every new feature, dependence on pervasive devices increases. In particular special purpose applications have become popular for such devices.

SUMMARY

A method, system, and computer program product for placement of a plurality of virtual machines on a hardware resource is provided.

One embodiment can be directed toward a method for a placement of a plurality of virtual machines. The method can include assigning, to a hardware resource, a plurality of candidate virtual machines selected from the plurality of virtual machines. The method can also include generating a user location vector for each candidate virtual machine from the plurality of candidate virtual machines by aggregating a plurality of user location metrics for each candidate virtual machine. The method can also include ranking, in response to a performance resource demanded by the plurality of candidate virtual machines being at or above a threshold of the performance resource available on the hardware resource, the candidate virtual machines as a function of an aggregate user location vector for each candidate virtual machine. The method can include selecting a subset of the candidate virtual machines for migration based on the ranking. The method can include migrating, responsive to the selecting, the subset of candidate virtual machines to the hardware resource.

Another embodiment can be directed toward a computer system configured to prioritize a plurality of candidate virtual machines to a hardware resource that provides computer processing resources to one or more virtual machines. The computer system can include one or more computer processors configured to include a performance adjustment module configured to migrate the candidate virtual machine from the plurality of virtual machines as a function of a user location vector. The one or more computer processors can also be configured to include a user location monitoring module configured to obtain the user location vector for each candidate virtual machine from the plurality of candidate virtual machines. The user location monitoring module can have the components of a user location metric module, and a virtual machine aggregation module. The user location metric module can be configured to determine a user location metric and measure the user location metric for a plurality of users of the candidate virtual machine. The virtual machine aggregation module can be configured to produce the user location vector for the candidate virtual machine by aggregating the user location metric for each of the plurality of users of the candidate virtual machine.

Another embodiment can be directed towards a computer program product.

BRIEF DESCRIPTION OF THE DRAWINGS

Embodiments are illustrated by way of example, and not by way of limitation, in the figures of the accompanying drawings in which like reference numerals refer to similar elements or steps.

DETAILED DESCRIPTION

Aspects of the present disclosure are directed toward a method of prioritizing virtual machines (VMs) when more VMs are assigned to an operating environment than supported by the operating environment. The prioritization of a VM over another VM can take place as a function of a user location vector. The prioritization can occur by measuring a user location metric for each user of the VM and aggregating the user location metric for each VM into a user location vector. Although not necessarily limited thereto, embodiments of the present disclosure can be appreciated in the context of prioritizing VMs as a function of the user location vector.

In the descriptions provided herein, specific details of various embodiments are provided. However, various embodiments may be practiced with less than all of these specific details. In other instances, certain methods, procedures, components, structures, and/or functions are described in no more detail than to enable the various embodiments of the disclosure, for the sake of brevity and clarity.

VMs can share access to one or more hardware resources. Consistent with various embodiments, a hardware resource can be capable of supporting a particular number of VMs (e.g., before significant degradation of VM performance). When VMs are targeted for migration, embodiments of the present disclosure are directed toward controlling the assignment of VMs to hardware resources. For instance, it is possible that VMs may be targeted for assignment to a hardware resource (or set of hardware resources) that is not capable of supporting additional VMs without significantly degrading performance.

The hardware resources that support one or more VMs can be distributed throughout an operating environment. In various embodiments, the hardware resource can include one or more processors devoted to processing computer instructions. For example, a hardware resource can include a processor core, a server blade, input/output devices, a computer, a laptop, processing access time to a mainframe, or combinations thereof. The VM performance can be improved by migrating an underperforming VM to a different hardware resource which can reduce latency or otherwise better serve a VM user.

Figure 1:
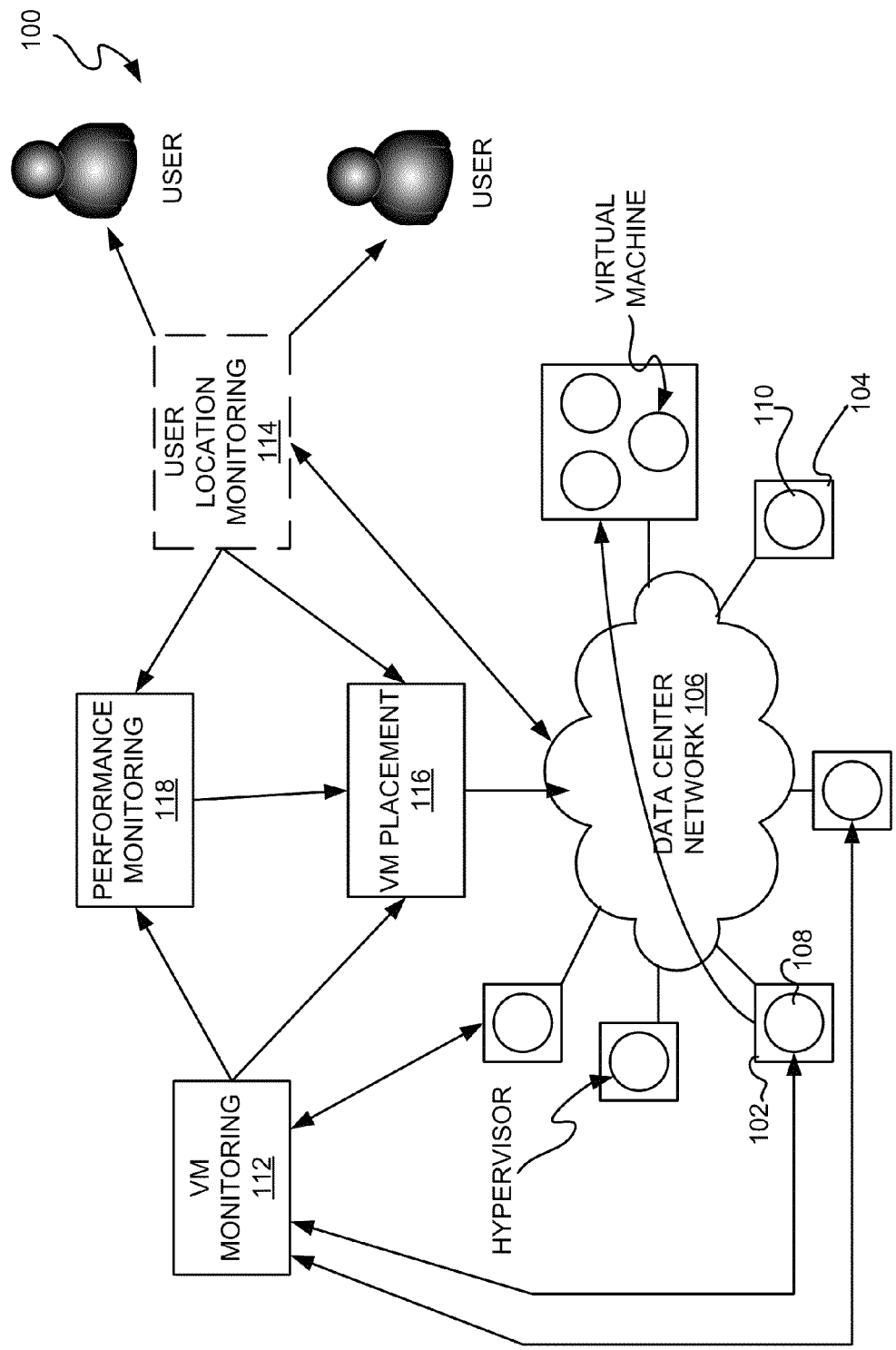
FIG. 1 depicts an operating environment, according to various embodiments.

FIG. 1 depicts an operating environment, according to various embodiments. In particular, FIG. 1 shows an operating environment 100 comprising a plurality of hardware resources such as a first hardware resource 102 and a second hardware resource 104. It should be noted that for simplicity only the first and second hardware resource 102, 104 have been explicitly identified in FIG. 1 to represent the plurality of hardware resources illustrated. Consistent with embodiments, the hardware resources 102, 104 can include (data) server devices, processor cores, I/O devices, storage devices and combinations thereof. Each of the plurality of hardware resources 102, 104 can be communicatively coupled to a network 106 such as, but not limited to, a data center network. The data center network 106 can comprise, but is not limited to, a three-tier architecture. Data center networks can use a variety of protocols and architectures including, but not limited to, Ethernet, Virtual Local Area Network (VLAN), Virtual Layer 2 (VL2), PortLand, or BCube.

In various embodiments, each of the hardware resources 102, 104 in the plurality of hardware resources can host one or more virtual machines (VMs) 108, 110. The operating environment 100 can also have a VM monitoring module 112, a user location monitoring module 114, a VM placement module 116, and a performance adjustment module 118. Each of these modules 112, 114, 116, 118 can be communicatively coupled to each other. The user location monitoring module 114 can be responsible for monitoring the location of users within a geographic area. The location monitoring can be accomplished using tools on a user system such as a Global Positioning System (GPS), or a triangulated position based on a wireless network. One or more of these modules 112, 114, 116, 118 can reside on a remote information processing system(s) and/or on one or more of the plurality of hardware resources 102, 104, including hardware resources hosting a virtual machine. Examples for each of these modules 112, 114, 116, 118 are discussed in greater detail herein.

Figure 2:
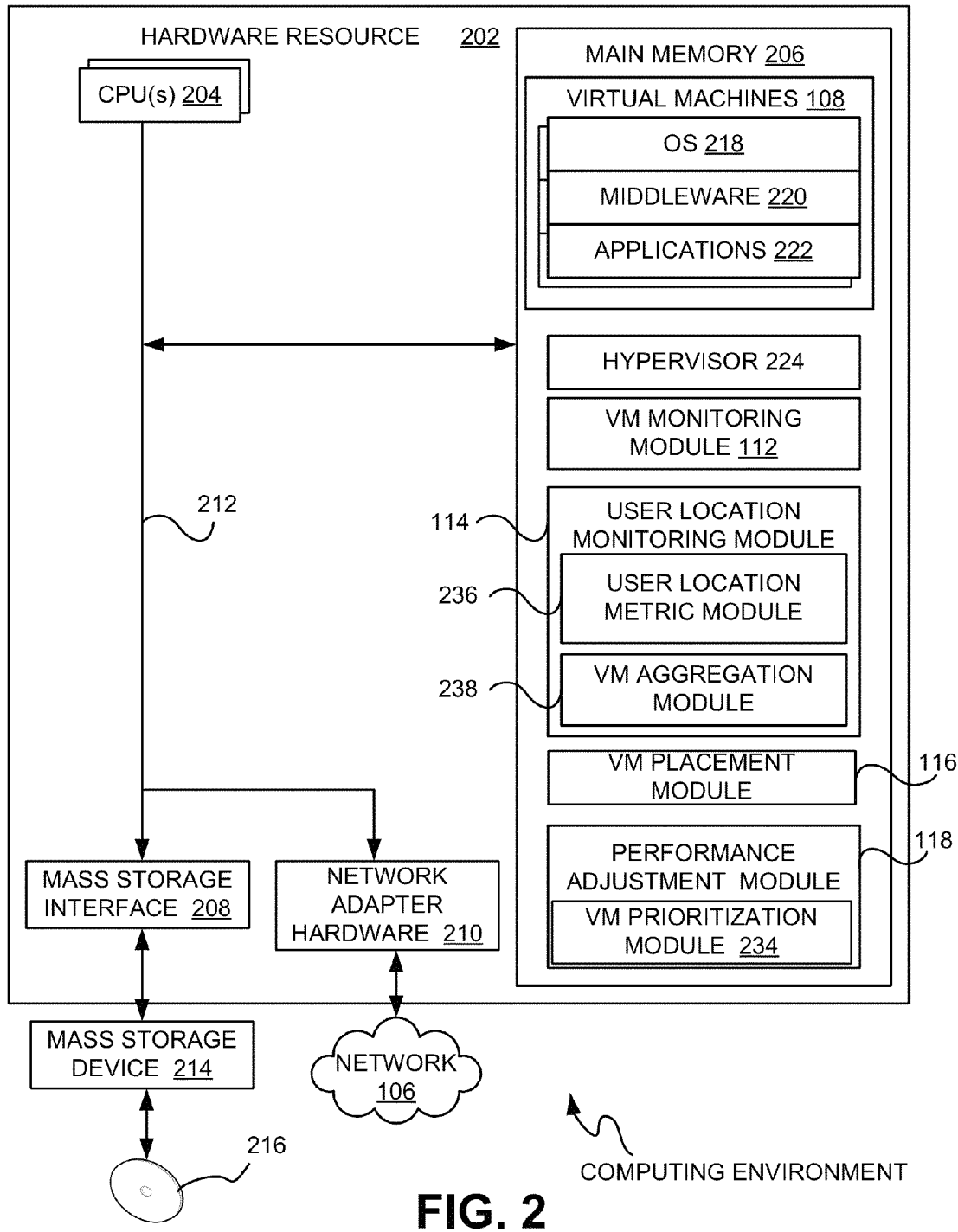
FIG. 2 depicts a block diagram illustrating a detailed view of hardware resources from an operating environment, according to various embodiments.

FIG. 2 depicts a block diagram illustrating a detailed view of a hardware resource, according to various embodiments. The computer 202 illustrated in FIG. 2 is an example of an embodiment of the hardware resources of FIG. 1, such as hardware resources 102, 104. The computer 202 has a processor(s) 204 that is connected to a main memory 206, mass storage interface 208, and network adapter hardware 210. A system bus 212 interconnects these system components. The mass storage interface 208 is used to connect mass storage devices, such as mass (data) storage device 214, to the hardware resource 202. One specific type of data storage device is an optical drive such as a CD/DVD drive, which can be used to store data to and read data from a computer readable medium or storage product such as (but not limited to) a CD/DVD 216. Another type of data storage device is a data storage device configured to support, for example, NTFS type file system operations.

Although only one CPU 204 is illustrated for the hardware resource 202, computer systems with multiple CPUs can be used equally effectively. Various embodiments of the present invention are able to use any other suitable operating systems as well. The network adapter hardware 210 is used to provide an interface to one or more networks 106. Various embodiments of the present invention are able to be adapted to work with any data communications connections including present day analog and/or digital techniques or via a future networking mechanism. Although one or more embodiments of the present invention are discussed in the context of a fully functional computer system, those skilled in the art will appreciate that embodiments are capable of being distributed as a program product via CD or DVD, e.g., CD 216, CD ROM, or other form of recordable media, or via any type of electronic transmission mechanism.

The main memory 206, in certain embodiments, includes one or more virtual machines 108. A virtual machine can be a discrete execution environment within a single computer to make the computer function as if it were two or more independent computers. Each virtual machine 108 is assigned the resources it needs to operate as though it were an independent computer, including processor time, memory, an operating system, and the like. Each virtual machine 108 includes an operating system 218, middleware 220, applications 222, and the like. Each virtual machine 108 can support specific guest operating systems and multiple user sessions for executing software written to target the guest operating systems. For example, one virtual machine can support an instance of the Linux® operating system, while a second virtual machine executes an instance of the z/OS® operating system. Other guest operating systems can also be supported as well.

The operating system 218 is a layer of system software that schedules threads and provides functions for making system resources available to threads, including memory access, access to input/output resources, and the like. The operating system can also control allocation and authorization for access to computer resources. The operating system can perform low-level basic tasks such as recognizing input from a keyboard, sending output to a display screen, keeping track of files and directories on a magnetic disk drive, and controlling peripheral devices such as disk drives and printers.

The operating system is also responsible for security, ensuring that unauthorized users do not access the system and that threads access only resources they are authorized to access. Operating systems useful for scheduling threads in a multi-threaded computer according to embodiments of the present invention are multi-threading operating systems, examples of which include UNIX®, Linux®, Microsoft NT™, AIX™, IBM's i 5os, and many others. The middleware 220 is software that connects multiple software applications for exchanging data. Middleware can include application servers, content management systems, web servers, and the like. Applications 222 are any software programs running on top of the middleware 220.

The main memory 206 also includes a hypervisor 224. The hypervisor 224 is a layer of system software that runs under the operating system and the virtual machines 108. That is, a hypervisor 224 runs between an operating system 218 and underlying physical computer components including physical processors 204. The hypervisor 224, among other things, can manage virtual machines 108. Although only one hypervisor 224 is shown, each virtual machine 108 can also have its own hypervisor.

The main memory 206, in one embodiment, also comprises the VM monitoring module 112, the user location monitoring module 114, the VM placement module 116, and the performance adjustment module 118. Although illustrated as concurrently resident in the main memory 106, respective components of the main memory 106 are not necessary to be completely resident in the main memory 106 at all times or even at the same time. It should be noted that although these modules 112, 114, 116, 118 are shown residing outside of the hypervisor 224 one or more of these modules can reside within the hypervisor 224 as well. It also should be noted, as discussed above, these modules 112, 114, 116, 118 are not needed to reside within a single hardware resource. For example, one or more of these modules 112, 114, 116, 118 can reside on a remote information processing system(s) and/ or on one or more of the plurality of hardware resources 102, 104.

Consistent with embodiments of the present disclosure, the VM monitoring module 112 can construct a traffic matrix between pairs of VMs. The traffic matrix can report the pair-wise traffic between VMs (as well VMs and their default getaway) for a given period of time. For example, the traffic matrix can report the number of packets (or number of bytes) exchanged between VMs in five minutes periods. In addition, the system can optionally store a series of traffic matrixes (in a loss-less or an aggregate format). These series of traffic matrices can be used, for example, in order to predict future traffic demands between VMs or to identify changes in the traffic patterns based on the historical data.

The traffic matrix can be constructed, in one embodiment, by appropriately implementing network traffic monitoring. An accurate construction of the traffic matrix can be achieved when the hypervisor 224 provides support for flow monitoring (e.g., Netflow support of the open vswitch in Linux). In this case, the exported flow information can be collected into a central location where the full traffic matrix can be trivially constructed. Optionally, flow information can be processed in a hierarchical manner in the case of large case deployments. If flow exporting is not supported on the hypervisor 224, then physical switches of the data center network 106 can be used for that purpose. It is also possible to infer the traffic matrix from aggregate statistics collected on switch ports (e.g., total incoming and outgoing packet counts, bytes, etc.) in combination with layer 2 forwarding information (e.g., MAC forwarding tables, VLAN configurations) and application layer information (e.g., application dependencies).

Various embodiments do not require traffic monitoring. For instance, the traffic matrix can be inferred by the application level topology. Given that sets of virtual machines can interconnect in order to form composite applications, the application level topology of those composites applications in combination with traffic models of the application level connections can be used to predict the traffic matrix. Accordingly, the traffic matrix construction can be enabled before the deployment of virtual machines.

The VM monitoring module 112 can also monitor the hardware resource for each VM. A hardware resource, in one embodiment, is an information processing system that hosts a hypervisor operating system and either zero or one or more virtual machines.

The user location monitoring module 114 searches for a user location vector for each virtual machine supported by the hardware resource 202. In various embodiments, the user location monitoring module 114 can be a part of the VM monitoring module 112. Multiple hardware resources, e.g., 102, 104 from FIG. 1, can be geographically separated and each support one or more virtual machines. The users of the virtual machines can be clustered in geographical regions. The user location monitoring module 114 can have a user location metric module 236 to search for the users using a variety of methods, e.g., a GPS signal, wireless triangulation, or IP address logging through known network access points and measure a user location metric. The user location monitoring module 114 can also have a VM aggregation module 238 to aggregate the user location metric for each user on a particular VM.

The user location metric module 236 can be used by the user location monitoring module to select and measure the user location metric. The user location metric can be defined by an application and can include a user velocity vector (speed and direction), a relative location for a user, a known route, or a predicted path for a user. The process for the user location metric module 236 will be described herein.

Figure 8:
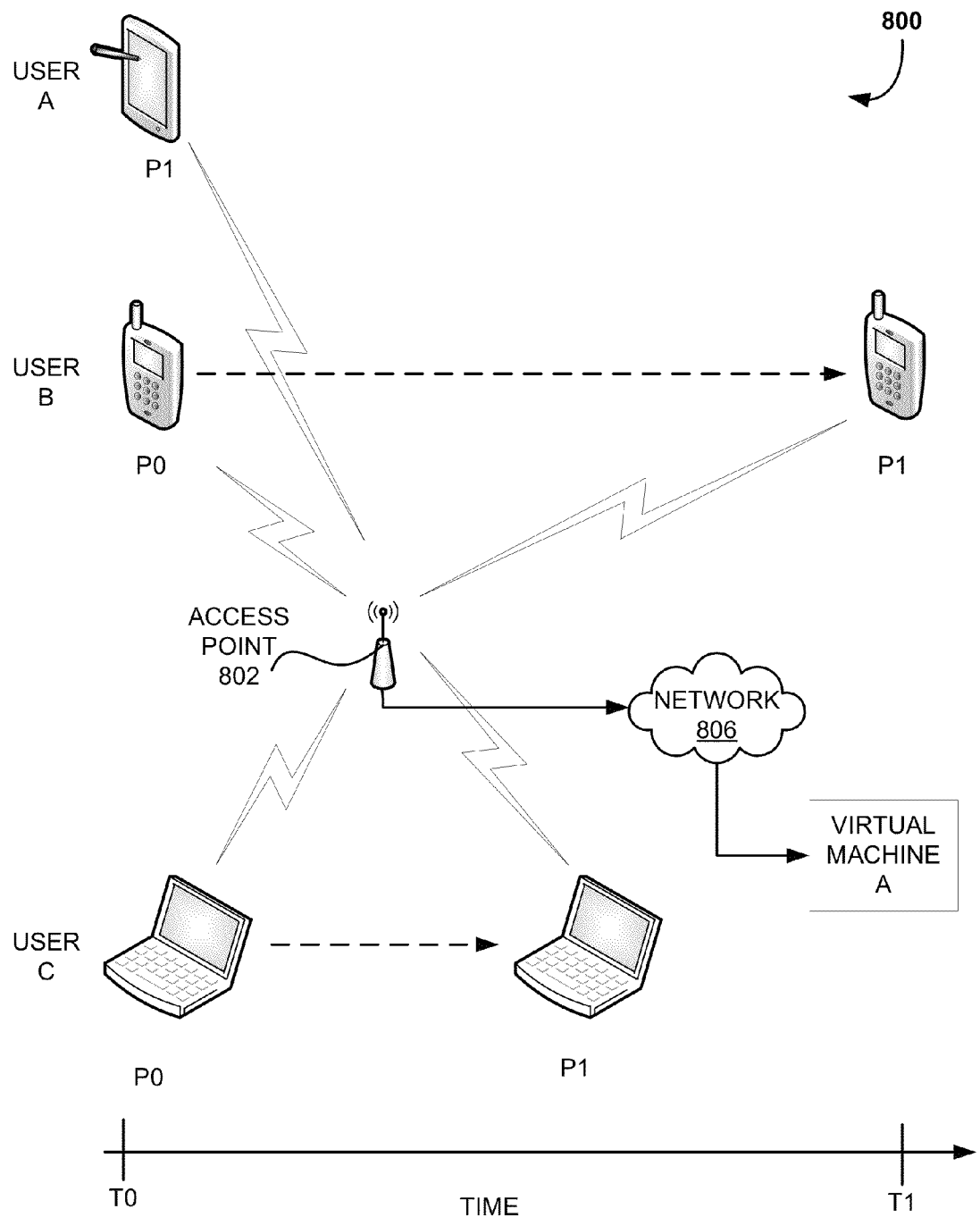
FIG. 8 depicts mobile users using a network to access a VM, according to various embodiments.

The VM aggregation module 238 can be configured to aggregate the users on a particular VM. An example of the VM aggregation is shown in FIG. 8.

The VM placement module 116 takes as input the hardware resource utilization (CPU, memory, I/O, etc.), the VM hardware resource requirements, the traffic, and the cost matrices, and produces as output a placement of VMs within the network that satisfies the VM hardware resource requirements and at the same time minimizes the product of pair-wise traffic between VMs and their network cost. The VM placement module 116 assigns VMs to slots while minimizing the overall objective function.

Slots can indicate opportunities for the hardware resource to host a virtual machine. The number of slots on a hardware resource can vary depending on the performance resources available to the hardware resource (discussed herein). A hardware resource with few performance resources available will have fewer slots than a hardware resource with many performance resources available. A VM can take up more than one slot on a hardware resource, particularly if the VM requires many performance resources.

In order to minimize the objective function, an inequality requires that VM pairs with heavy traffic volume shall be assigned to slot pairs with low distance. Instead of a direct mapping from individual VMs to individual slots, a two-step mapping method, in one embodiment, is used. In the first step, VMs are grouped into clusters by placing VM pairs with heavy traffic in the same cluster. In accordance with the VM clusters, slots are grouped into clusters by placing slot pairs in different clusters if such a slot pair has large distance. The goal for these two clustering processes are two-fold: (1) for any VM cluster there is a corresponding slot cluster with equal cluster size; (2) the one-to-one correspondence ensures that VM-clusters with large intra-cluster traffic volume are assigned to those slot-clusters with small intra-cluster distance. In the second step, inside each VM cluster and its associated slot cluster, individual VMs are assigned to individual slots.

The performance adjusting module 118 monitors changes in the VM workload (addition and deletion of VMs, changes in the VM requirements, major shifts in the traffic matrix) as well as changes in the cost matrix and requests reshuffling of VMs when the placement is sub-optimal. The performance adjusting module 118 can also have a VM prioritization module 234. The VM prioritization module 234 prioritizes or ranks the VMs on a hardware resource based on the aggregate location vector. A VM that has a lower rank than another VM will not be supported by a hardware resource with a performance resource for only one VM.

Figure 3:
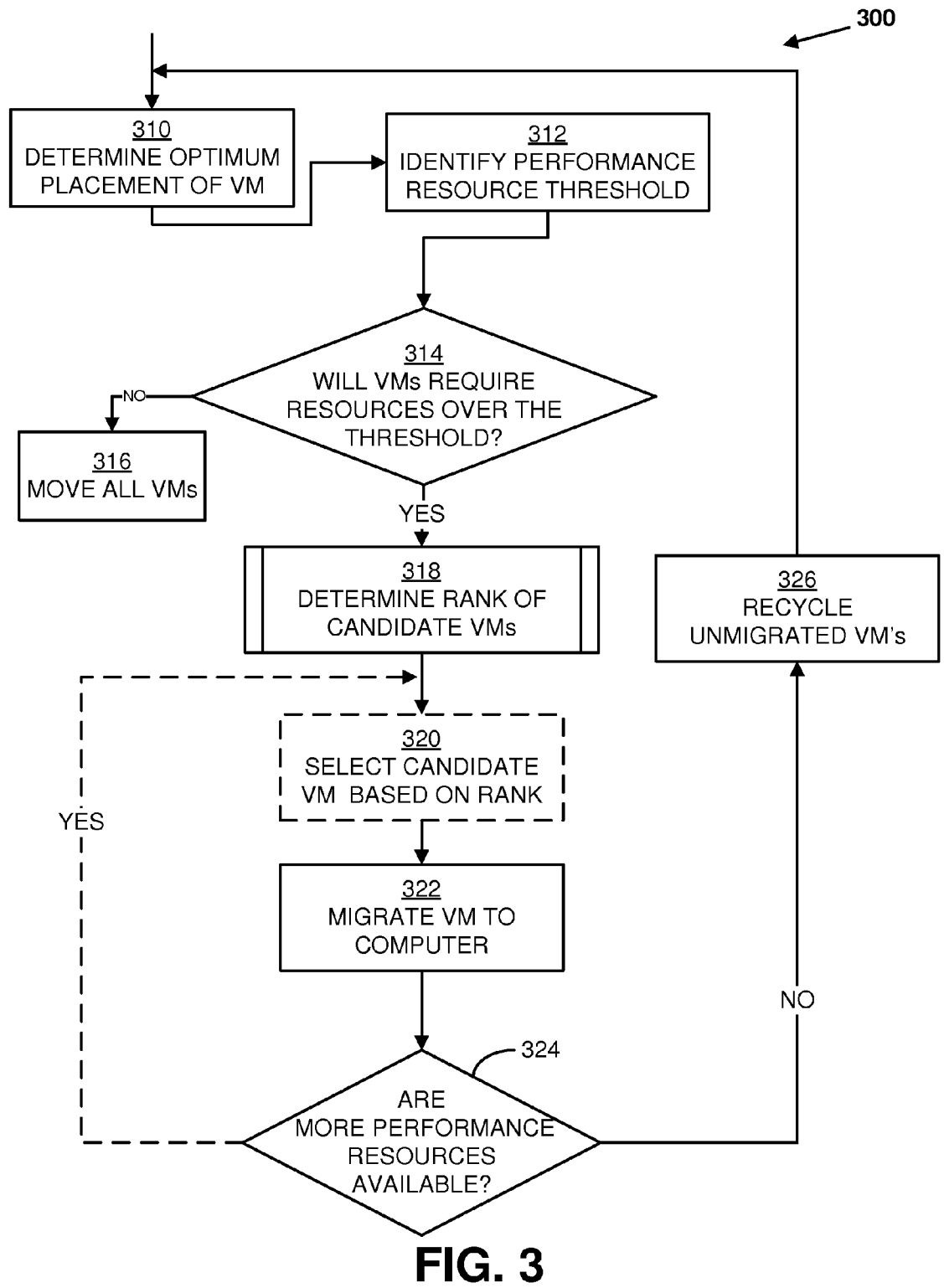
FIG. 3 depicts a flowchart of a method of prioritizing selected migrating VMs to hardware resources based on rank, according to various embodiments.

FIG. 3 depicts a flowchart of a method of prioritizing selected migrating VMs to a hardware resource based on rank, according to various embodiments. The method 300 can begin at operation 310. In operation 310, the optimum placement of VMs on a hardware resource in operating environment can be determined. For example, if there are three VMs on a first hardware resource, then the performance adjustment module 118 can migrate a VM from a second hardware resource to the first hardware resource based off of information from the VM monitoring module 112. In various embodiments, operation 310 can involve the VM placement module 116 assigning more VMs than performance resources available to the hardware resource as an initialization step based off of information from the VM monitoring module 112. These VMs that use performance resources beyond the performance resources available on the hardware resource can also be referred to as candidate VMs throughout this disclosure. Using the aforementioned example, the VM placement module 116 can determine that four VMs can be assigned to a first hardware resource, but the first hardware resource has performance resources to support three VMs without impacting performance of the remaining VMs. The four VMs can be considered the candidate VMs. The candidate VMs are candidates to be moved to the hardware resource and have not actually been moved, according to various embodiments.

The performance resources can be either hardware-based or software-based for each VM. Examples of performance resources can include processor cycles, a latency, a memory usage, or an overall processing speed. It can be possible for each VM to require different levels of performance resources. For example, for a hardware resource supporting a first VM, a second VM, and a third VM, the first VM can require 40% of the performance resources, the second VM can require 5% of the performance resources, and the third VM can require 55% of the performance resources for the hardware resource. After the optimum placement of VMs in the operating environment, then the method 300 can proceed to operation 312.

In operation 312, the performance resource threshold is identified. The performance resource threshold can be used to determine whether a candidate VM will require more performance resources than a hardware resource can provide. Any number of candidate VMs can be identified for migration. However, the migration of candidate VMs to the hardware resource can require more performance resources than is currently supported by the hardware resource and impact the performance of other VMs currently supported by the hardware resource.

The performance resource threshold can encompass a continuum of values such as a range. In various embodiments, the performance resource threshold can be an upper limit (maximum or preferred) or lower limit (minimum or preferred) value for a performance resource. For example, if the performance resource is the utilization of the processor, then the performance resource threshold as a maximum value could be 20% utilization so that any usage of all VMs on the hardware resource could not go over 20% utilization. The performance resource threshold can apply to individual VMs on the hardware resource instead of to the aggregate of VMs on the hardware resource. Continuing with the example above, if the hardware resource could not go over 20% utilization, then the hardware resource could determine how to allocate performance resources on the VMs so that the overall performance resource for the hardware resource does not go above 20% utilization. In various embodiments, the performance resource threshold can be a dynamic threshold and vary based on hardware resource resources.

If the hardware resource supported two VM's, this could be accomplished by determining that the first VM could not cause over 5% overall utilization, the second VM could not cause over 10% overall utilization, and any subsequent candidate VMs could not cause over 5% overall utilization. The VM monitoring module 112 could also dissect the overall utilization into discrete steps. For example, the VM monitoring module 112 could determine that the criteria for measuring the 5% overall utilization for the first VM corresponds to 24 million CPU cycles.

The performance resource threshold could also be a minimum value. For example, if the performance resource is the number of users, then the performance resource threshold could be a minimum of one user on a VM. Any less than one user could result in the VM being deactivated. After the performance resource threshold is identified in operation 312, the method 300 can proceed to operation 314.

In operation 314, the performance resources requested by some or all of the VMs on a hardware resource can be measured. The measured performance resource can be compared with the performance resource threshold. In various embodiments, the performance resources requested can be determined by forecasting a predicted performance of a VM based on factors such as past processor or memory usage. For example, if a VM had an average CPU utilization of 4% for the past 20 minutes, then the CPU utilization of the past 20 minutes could be used to predict that the VM would have a CPU utilization of 4% which could be used by the VM monitoring module 112. Likewise, a candidate VM can also be measured in a similar fashion even though a particular VM may not request the same performance resources as the candidate VM requested on a different hardware resource. Once the performance resources requested for the candidate VMs are determined, then the performance resource can be compared with the performance resource threshold for the hardware resource. If the performance resource requested by a candidate VM is less than the performance resource threshold, then the method 300 can move all candidate VMs to the hardware resource in operation 316. Once all of the candidate VMs are migrated to the hardware resource, then the candidate VMs are no longer candidate VMs. If the performance resource requested is more than the performance resource threshold, then the method 300 can continue to operation 318.

In operation 318, the user location module 114 and the performance adjustment module 118 can rank the candidate VMs. Generally, the ranking can occur by measuring a user location metric for each user and aggregating the user location metric for one or more users of the virtual machine in a user location vector. The user location vector can be ranked using the performance adjustment module 118. Operation 318 is described more fully in the sections herein. After the ranking of the VMs is determined, then the method 300 can proceed to operation 320.

Operation 320 through operation 324 can represent optional paths in various embodiments. Generally, on a first path, a candidate VM is selected one at a time in a looping manner to be migrated to a hardware resource until there are no more available performance resources available. On a second path, generally, candidate VMs are selected in groups to be migrated to a hardware resource. The paths can be, but are not necessarily, mutually exclusive. For example, if the method 300 takes the first path, then the method 300 can be tied to the first path or the method 300 could switch from the second path to the first path but not vice versa.

Therefore, operation 320 can be considered optional and apply to the first path depending on application preferences. The application preferences can be defined by a user of the prioritization method, according to various embodiments. In operation 320, the candidate VM can be selected as a function of rank. For example, the highest ranked candidate VM can be selected first as a number one candidate VM to migrate to a hardware resource. In various embodiments, a lowest ranked candidate VM can be selected first. Examples of selecting candidate VMs can be further described herein. After a candidate VM is selected, then the method 300 can proceed to operation 322.

In operation 322, the performance adjustment module 118 can migrate the candidate VM to a hardware resource. After the migration, the candidate VM can be integrated with the hardware resource. The method 300 can proceed to operation 324. In operation 324, the performance adjustment module 118 can determine whether any remaining candidate VMs can be accommodated by the hardware resource. The performance resource threshold can be compared to the performance resource requested by the next ranked candidate VM. The analysis could be similar to the analysis in operation 314. In various embodiments, the performance adjustment module 118 can determine whether there is any possibility of adding a VM to the hardware resource. If there a possibility of adding a VM to the hardware resource, then the method 300 can continue to operation 320. If the hardware resource cannot add any more VMs to the hardware resource, then the unmigrated VMs can be "recycled" in operation 326.

Operation 326 can be used to introduce a candidate VM back into a candidate VM pool. The candidate VM pool can be where candidate VMs that were not migrated are queued. For example, if the candidate VM could not be migrated to the hardware resource, then the candidate VM can be held in a queue. The hardware resource can further assign the time spent in a candidate VM pool as a user location metric as discussed therein. The candidate VM can be reanalyzed in operation 310 to determine if the candidate VM needs to be migrated. Circumstances that cause the need for migration for a candidate VM may no longer exist in the operating environment which can save on system resources.

Figure 4:
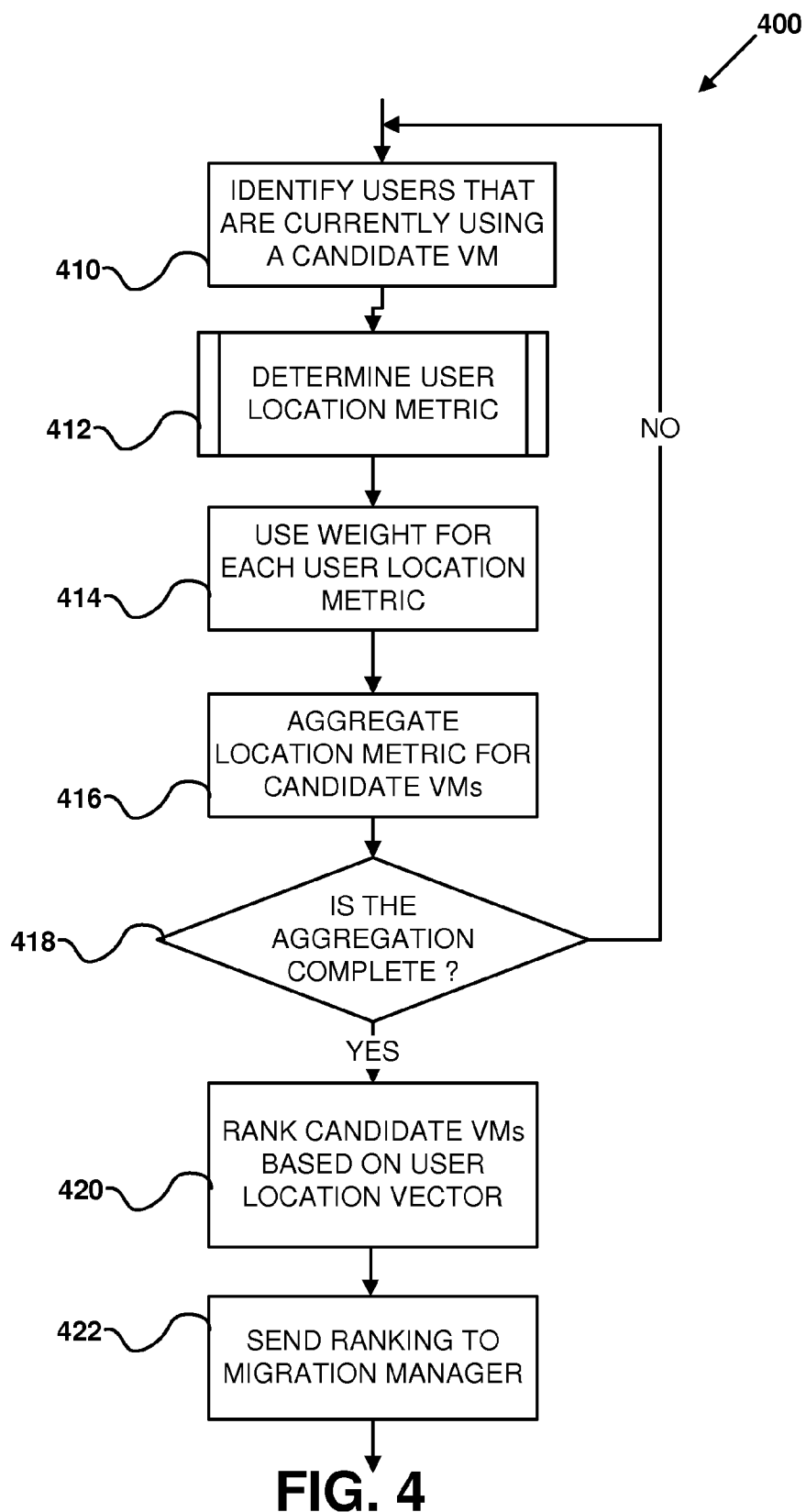
FIG. 4 depicts a flow chart of a method of determining a rank of candidate VMs, according to various embodiments.

FIG. 4 depicts a flow chart of a method 400 of determining a rank of candidate VMs, according to various embodiments. The method 400 can correspond to operation 318 from FIG. 3. Method 400 can begin at operation 410.

In operation 410, the user location metric module 236 can identify users that are currently using a particular candidate VM. A candidate VM can support any number of users that are spread out through a geographic area. In various embodiments, the geographic area can be defined by the application. After the users of a candidate VM are identified, then the method 400 can continue to operation 412.

In operation 412, the user location metric module 236 can determine the user location metric to use for each user. The user location metric can be used to measure a user's interaction with a hardware resource. In various embodiments, a user location metric can be used to separate the users that have unfavorable interactions with the hardware resource. In various embodiments, more than one user location metrics can be used for a particular VM. For example, if a VM has 4 users, then the first and second user can use a user selection metric of velocity, the third and fourth user can use a user selection metric of proximity to a geographic location. The selection of the user location metric will be discussed below in FIG. 5. After the user location metric is selected, then the method 400 can continue to operation 414.

In operation 414, the weight for each user location metric can be applied. The weight can be determined by the application using factors such as a virtual machine (VM) profile. The VM profile can be a collection of all of the preferences for each user. For example, the weight can vary based on each user in the VM profile. A user that frequently accesses the VM can have a higher weight associated with its user location metric than a user that infrequently accesses the VM. The VM profile can also include historical locations for each user that can be used to give more weight to a particular user. For example, if a particular user historically boards a train running at a certain time, the user location metric of the user boarding on the train can increase the user's weight. After the weight is applied, then the method 400 can continue to operation 416.

In operation 416, the VM aggregation module 238 can aggregate the user location metric for all users on a candidate VM. During aggregation, the user location metric for each user is compiled together to produce a user location vector for the candidate VM. Embodiments of operation 416 are described in more detail herein. After aggregation, the method 400 can continue to operation 418. In operation 418, the user location monitoring module 114 can be used to determine if the aggregation is complete. In certain instances, the aggregation would be complete when the aggregation is performed for every candidate VM. In various embodiments, new candidate VMs can be produced in prior operations. The user location metric module 236 can be used to measure and aggregate the user location metrics for new candidate VMs. In various embodiments, the aggregation can be complete when a substantial proportion of the candidate VMs or user location metrics for a candidate VM, as determined by the application, is aggregated. If the aggregation is not complete, then the method 400 can continue to operation 410. If the aggregation is complete, then the method 400 can continue to operation 420.

In operation 420, the candidate VMs are ranked by the VM prioritization module 234 based on the user location vector determined by the VM aggregation module 238. The ranking can vary depending on the application preferences. For example, there can be situations that are advantageous to rank a low user location vector higher than a high user location vector and vice versa. After the candidate VMs are ranked, then the method 400 can continue to operation 422.

In operation 422, the ranking determined by the VM prioritization module 234 can be utilized by the performance adjustment module 118 to actively place the higher or lower ranked VMs into available spots on the hardware resource.

Figure 5:
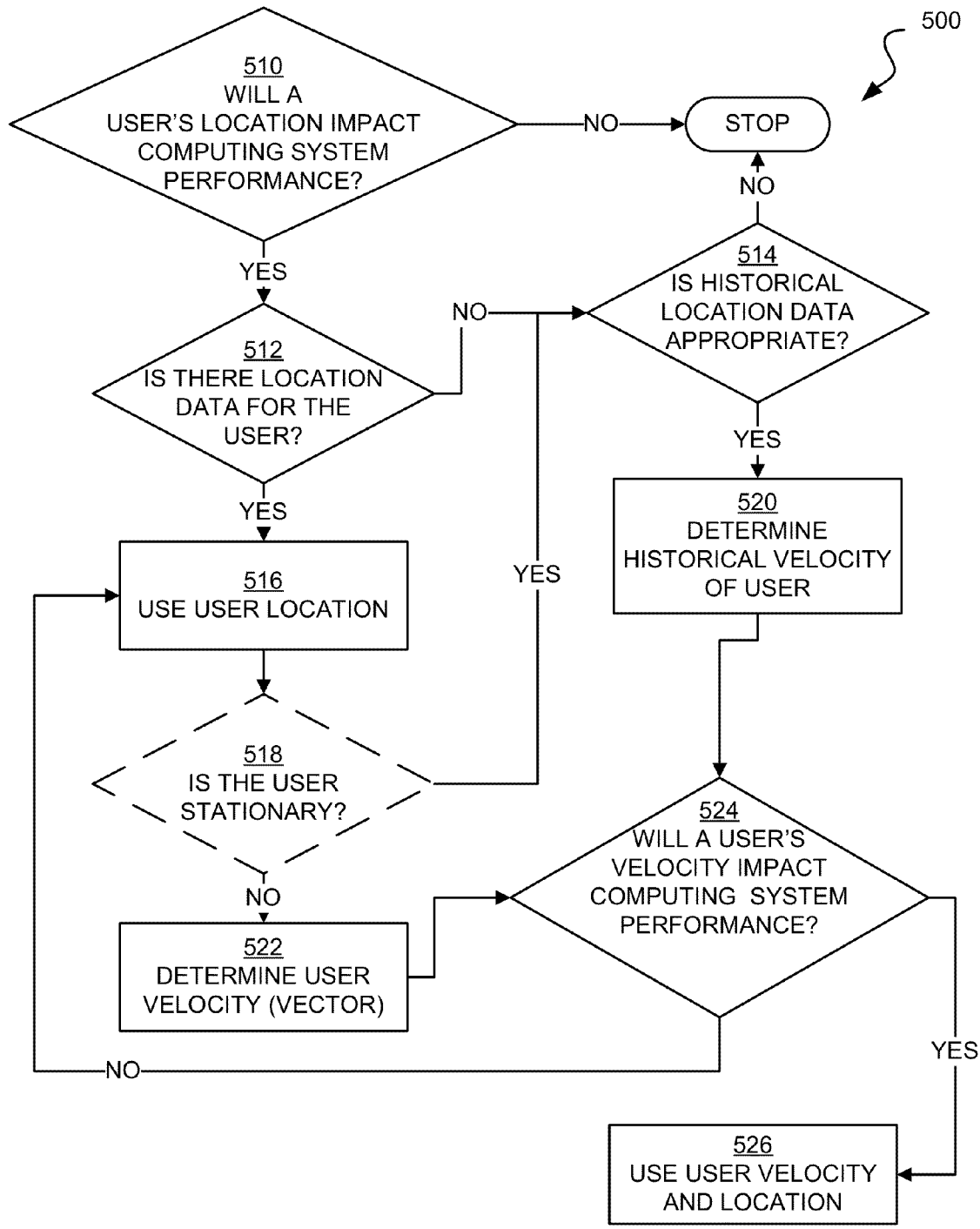
FIG. 5 depicts a flowchart of a method of selecting a user location metric, according to various embodiments.

FIG. 5 depicts a flowchart of a method of selecting a user location metric, according to various embodiments. The method 500 can involve selecting between elements of the user location metric of velocity. Velocity is made up of components of location, time, and direction. Thus, there are situations were velocity may not be applicable as a user location metric, such as when a user is stationary or when the time is not measured. A goal of the analysis in method 500 can be predicting how the requirements of a user impact the performance of the VM.

The method 500 can begin at operation 510. In operation 510, the user location monitoring module 114 can determine if a user's location will impact a hardware resource's computing performance. The analysis in method 500 can also be referred to as an expected impact on the performance of the hardware resource. There can be situations where the user location has no impact on a hardware resource's performance. For example, the user location can have no impact if the user location is fixed using a hard-wire connection. If there is no impact on the hardware resource performance, then the method 500 can stop. If there is an impact on the hardware resource performance, then the method 500 can proceed to operation 512.

In operation 512, the user location metric module 236 can determine if there is location data for the user. There can be moments when location data is not available. For example, if the user is using an IP masking service or if the location functions on a mobile device are deactivated, such as a GPS. If the location data is not available, then the method 500 can continue to operation 514. If the location data is available, then the method 500 can continue to operation 516.

In operation 514, the user location metric module 236 can determine if using historical location data is appropriate. Historical location data can be appropriate when a device has historical location data and the application does not predict that the location will vary. If the historical user location is not predicted to significantly change, e.g., when the user gets on a train every Tuesday morning that follows a particular route, then use of the historical user location would be appropriate and the method 500 can continue to operation 520. If the historical user location is not available for a user, then the use of the historical user location is not appropriate and the method 500 can stop.

In operation 516, the user location metric module 236 can use the user's location that was obtained from a location device such as a GPS or router. If the user is stationary, then the method 500 can continue to operation 518. In operation 518, the user location metric module 236 can determine if the user is stationary. A user would be stationary if, during a time period determined by the application, the user does not change position or geographic locations. A user would be stationary if sitting at a desk. If the user is stationary, then the user would have a velocity of zero and the method 500 can continue to operation 514.

In operation 520, the user location monitoring module 114 can use the historical user location data and a time period to determine a historical velocity of a user. The historical velocity can be based on the most recent velocity measurement of a user. For example, if the user is stationary, then the most recent move that the user had to take to become stationary would be the period. After the historical velocity of the user is obtained, then the method 500 can continue to operation 524.

In operation 522, the user location metric module 236 can use the user location and a time period to determine the user velocity. The time period can be defined by the application. For example, when the user has a steady velocity, then the time period can be short, but when the user has an intermittent velocity with rapid bouts of acceleration, then the time period can be longer to average out the velocity. A direction vector can also be taken when determining a velocity. Operation 522 and operation 520 can have similar analysis. After the user velocity of operation 522 or the historical user velocity of operation 520 is determined, then the method 500 can continue to operation 524.

In operation 524, the user location monitoring module 114 can determine if the user's velocity can impact the hardware resource performance. The user velocity may not impact the hardware resource performance if all of the movement occurs within the geographic boundaries for a particular service area for a hardware resource. For example, if a hardware resource hosting a particular VM covers a geographic area of 300 square miles within a city, then a user operating within the coverage area may not affect the performance of the hardware resource compared to a user operating outside of 400 square miles and moving toward an area of more sparse coverage. Likewise, a user that is moving toward an access point outside of the coverage area can have less of an impact than a user moving away from an access point inside of the coverage area. If the user location monitoring module 114 determines that the user's velocity can impact the hardware resource performance, then the method 500 can continue to operation 526. If the user location monitoring module 114 determines that the user's velocity does not impact the hardware resource performance, then the method 500 can continue to operation 516 where a user location is used as the user location metric.

In operation 526, the user velocity, and by inference the user location, can be selected as the user location metric by the user location monitoring module 114.

Figure 6:
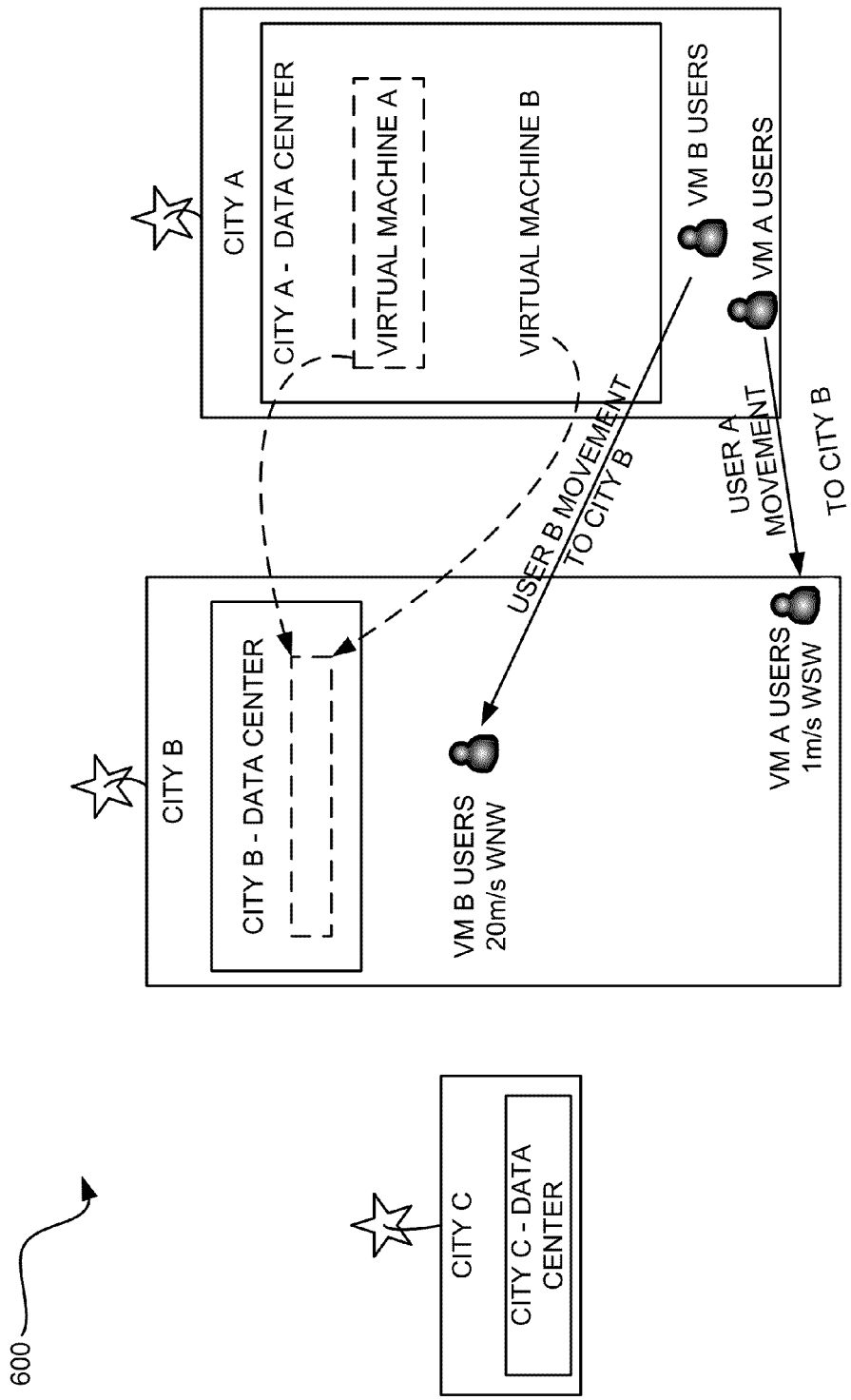
FIG. 6 depicts a geographic area with multiple data centers each hosting virtual machines, according to various embodiments.

FIG. 6 depicts a geographic area 600 with a data center with multiple hardware resources, each hosting virtual machines, according to various embodiments. The geographic area 600 can described how a user location metric impacts the selection of where virtual machines are hosted in a multi-city data center. The geographic area 600 can include three cities: City A, City B, and City C with one data center each. The cities are shown at relative distances and directions from each other. For example, City A is slightly East South East (ESE) from City B. In the following example, the term data center can be used interchangeably with the term for operating environment. The data center can be a type of operating environment and contain multiple hardware resources. The City A data center can host two virtual machines, virtual machine A, and virtual machine B. Virtual machine A can support the VM A users, and virtual machine B can support the VM B users.

In the example, the VM A users are moving in the aggregate at 1 m/s West South West (WSW) while the VM B users are moving in the aggregate at 20 m/s West North West (WNW). The movement of VM A to the City B Data Center can be prioritized on the basis that its prime-use within City B is moving slower and thus the City B Data Center is likely to remain optimal for it for longer.

In the example above, the prime-use velocity can be established for any particular VM by the formula:

$$\sum_{Users(UserLocation=CityB)} \left( \frac{LocationCoordinates(User, now) - LocationCoordinates(User, now-1\ hr)}{1\ hr} * weight \right)$$

Where:

$$weight = \frac{\sum_{now-1\ hr}^{now} DataVolume(User)}{\sum_{Users(UserLocation=CityB)} \left( \sum_{now-1\ hr}^{now} DataVolume(User) \right)}$$

In another example, a cloud-provider can offer a service where it hosts a different type of VMs for mobile-users, where the latency in the communication between the user-client and the VM has a significant impact on the user-experience. If the cloud provider has to provide a financial rebate back to the users when the latency goes above a certain value, then, in order to keep the latency as low as possible, the cloud provider monitors the latency experienced by each VM's user, as well as the location of each VM's users.

At one time, the cloud provider's VM-Placement algorithm examines the users of those VMs. At a later time, cloud provider's VM-Placement algorithm examines the users of VM A and sees that the latency the VM A users are now experiencing is threatening to incur a rebate. The affected users have moved to a location where movement of the VMs to the City B Data Center would significantly improve their aggregate experienced-latency.

The cloud provider then decides to prioritize the movement of VM B to the City B Data Center on the basis that its prime-use within City B is moving faster and thus the City A Data Center is likely to become more unsuitable for its users at a faster rate.

Figure 7:
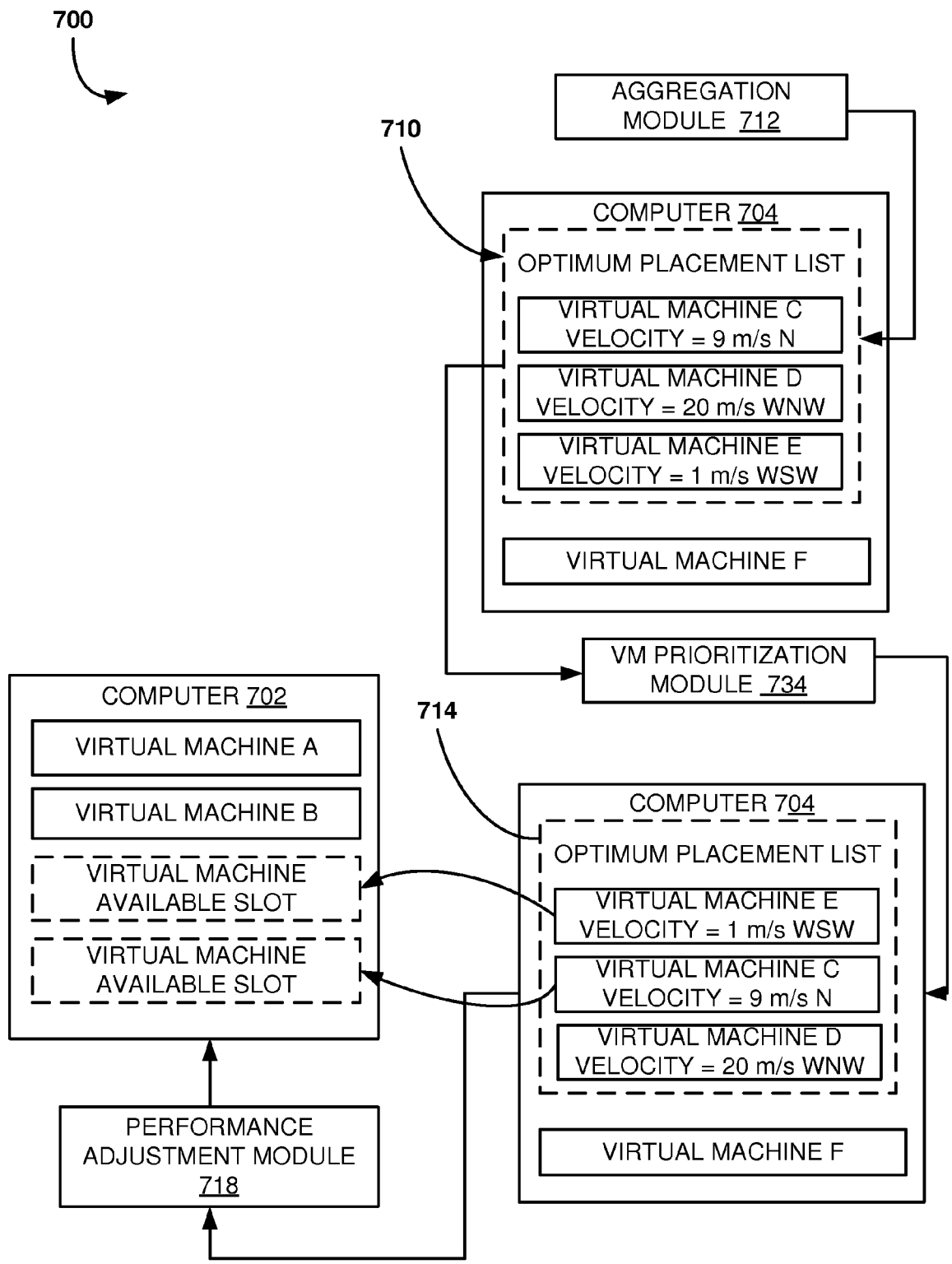
FIG. 7 depicts a block diagram describing how multiple VMs are sorted within the operating environment, according to various embodiments.

FIG. 7 depicts a block diagram 700 describing how multiple virtual machines are sorted within an operating environment, according to various embodiments. The operating environment can have a plurality of hardware resources. The diagram 700 can include an aggregation module 712. The VM aggregation module 712 can correspond to the VM aggregation module 238 from FIG. 2. The VM aggregation module 712 can aggregate the user location metrics, e.g., user velocity, for some (or all) of the users on a particular VM to produce a user location vector.

Also depicted is the computer 704 which can correspond to the computer 104 on FIG. 1 and can generically be referred to as a hardware resource. The hardware resource 704, can hold one or more VMs and include an optimum placement list 710. The optimum placement list 710 are selected VMs that can be moved to other hardware resources. The optimum placement list 710 includes VMs that can be aggregated and prioritized. For example, the optimum placement list 710 can include VM C, VM D, VM E, while the hardware resource 704 can also include VM F. VM C, D, and E have received the aggregate value from the VM aggregation module 712.

Once the VMs in the optimum placement list 710 have been aggregated, then the VM prioritization module 734 can prioritize the VMs based on the aggregate user location vector. The VM prioritization module 734 can correspond to the VM prioritization module 234 from FIG. 2. In various embodiments, the prioritization can take place according to some of the factors mentioned in FIG. 6 depending on the application preferences.

After the VMs have been prioritized, then the optimum placement list 710 can have the VMs ranked according to their aggregate user location vector values in a sorted optimum placement list 714. The sorted optimum placement list 714 can be sorted with the slowest user location vector ranked highest in order to facilitate the user location vector with the least change. The performance adjustment module 718 can be used to select VMs from the sorted optimum placement list 714 to migrate to another hardware resource 702. The performance adjustment module 718 can correspond to the performance adjustment module 118. The hardware resource 702 can be the same as the computer 102 from FIG. 1. The hardware resource 702 can support up to two virtual machines without going over the performance resource threshold. Therefore, the performance adjustment module 118 can select VM E and VM C.

FIG. 8 depicts mobile users 800 using a network to access a virtual machine, according to various embodiments. The mobile users 800 can include user A with a tablet, user B with a mobile phone, and user C with a laptop. The mobile users can connect to the network via an access point 802. The access point 802 can be a cellular data tower or a WiFi router. The access point 802 can connect the mobile users 800 with the network 806. The network 806 can correspond to the network 106 in FIG. 1. The mobile users 800 can access a virtual machine, e.g., virtual machine A, that can reside on a hardware resource. VM A can, but not necessarily, correspond to VM A from FIG. 6.

During the time period from Time, T0, to Time, T1, the mobile users 800 each have an initial position, P0, and a position at T1, P1. During the time period T0 to T1, User A has not moved, User B, moved the most, and User C moved less than User B.

Figure 9:
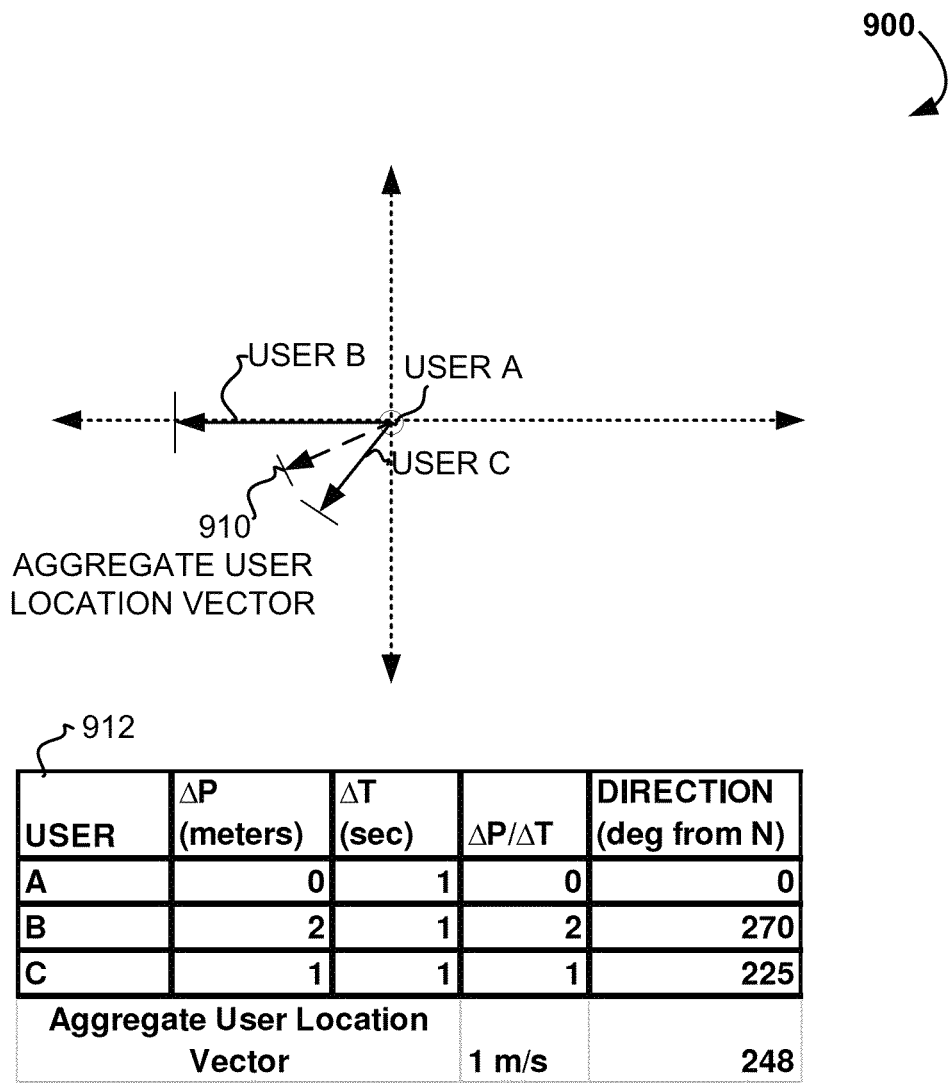
FIG. 9 depicts a vector graph of the aggregation of different users on a VM, according to various embodiments.

FIG. 9 depicts a vector graph 900 of the aggregation of different users on a VM, according to various embodiments. The vector graph 900 can be a continuation of the mobile users 800 in FIG. 8. In the vector graph 900, the user location monitoring module 118 from FIG. 1 can compute the velocity vectors for the mobile users 800, including User A, User B, and User C. Each mobile user 800 can be associated with a user location metric, such as a velocity as shown on table 912. A VM aggregation module can be used to aggregate all (or some) of the user location metrics for the mobile users 800 using the VM and produce an aggregate user location vector 910 for the VM as described herein.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud computing model generally includes at least five characteristics, at least three service models, and at least four deployment models.

The five characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The service models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The deployment models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is generally service oriented, with a focus on statelessness, low coupling, modularity, and semantic interoperability. At the heart of cloud computing is an infrastructure comprising a network of interconnected nodes.

Figure 10:
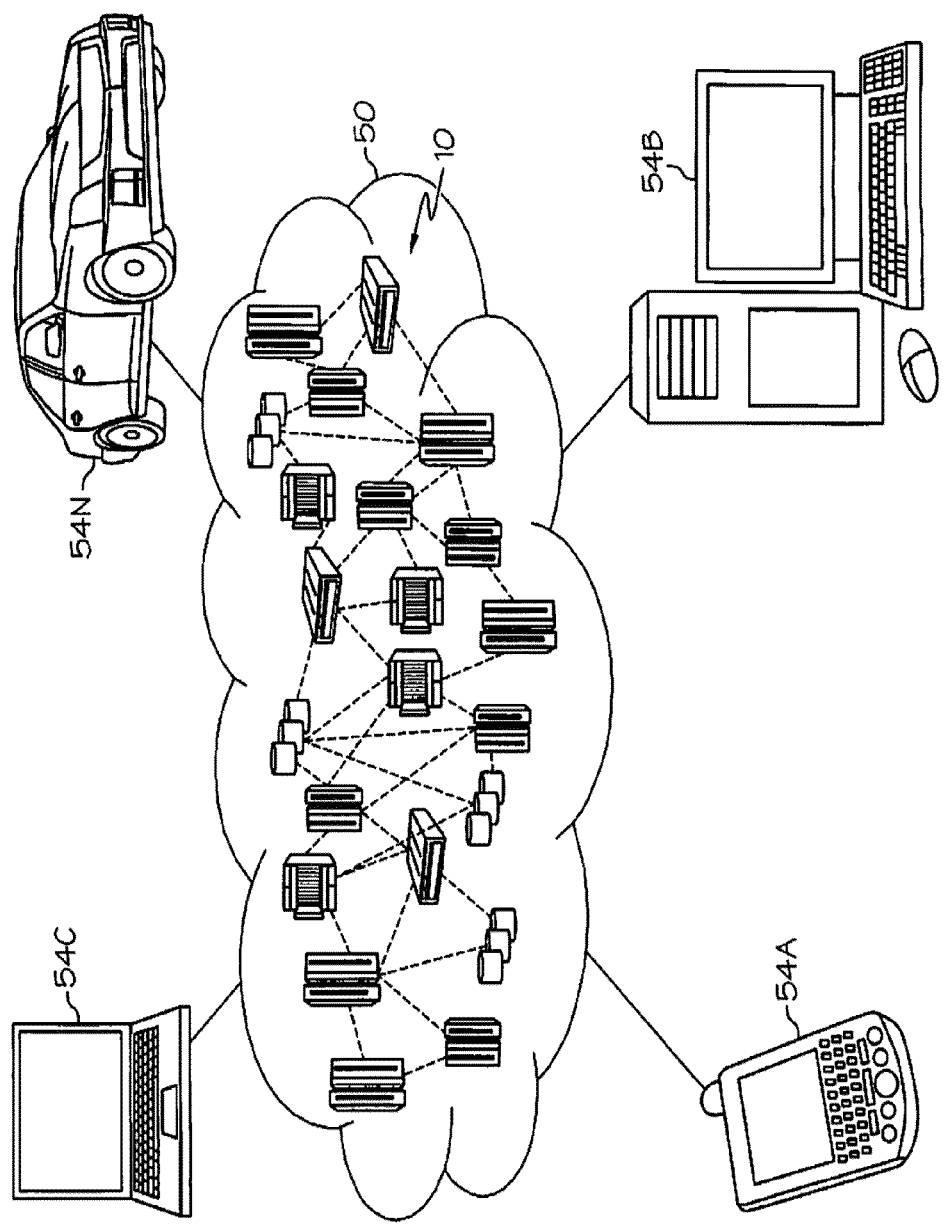
FIG. 10 depicts a cloud computing environment, according to various embodiments.

FIG. 10 depicts a cloud computing environment 50, according to various embodiments. As shown, cloud computing environment 50 comprises one or more cloud computing nodes 10 with which local computing devices 54 used by cloud consumers, such as, for example, personal digital assistant (PDA) or cellular telephone 54A, desktop computer 54B, laptop computer 54C, and/or automobile computer system 54N can communicate. In various embodiments, the local computing devices 54 can be Remote Electronic Devices (REDs). Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device 54. It is understood that the types of local computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
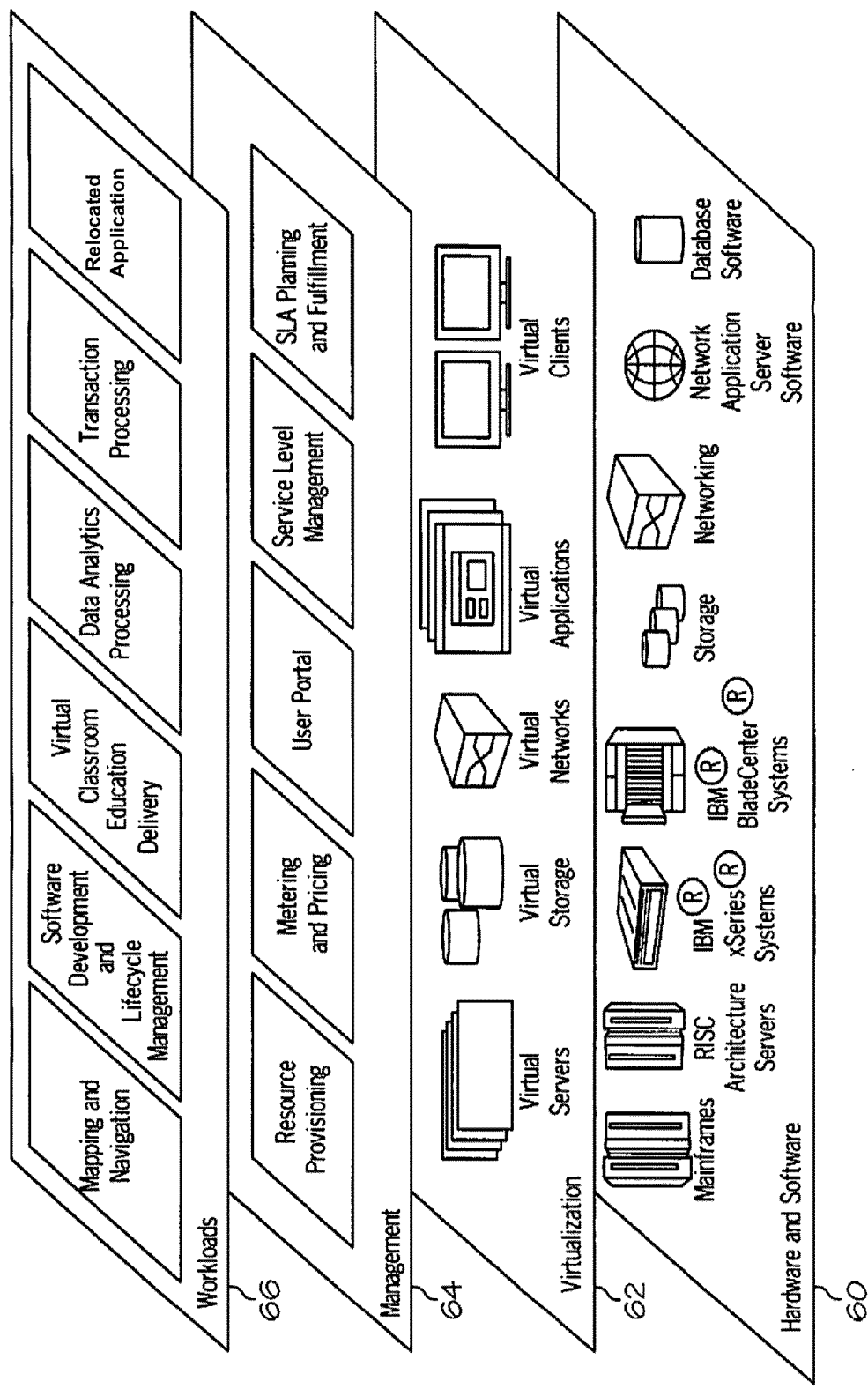
FIG. 11 depicts a set of functional abstraction layers provided by the cloud computing environment, according to various embodiments.

FIG. 11 depicts a set of functional abstraction layers provided by the cloud computing environment 50 (FIG. 10), according to various embodiments. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities can be provided: virtual servers; virtual storage; virtual networks, including virtual private networks; virtual applications and operating systems; and virtual clients.

In one example, management layer 64 can provide the functions described herein. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources can comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment can provide pre-arrangement for, and procurement of, cloud computing resources for which a future requirement is anticipated in accordance with an SLA.

Workloads layer 66 provides examples of functionality for which the cloud computing environment can be utilized. Examples of workloads and functions which can be provided from this layer include: mapping and navigation; software development and lifecycle management; virtual classroom education delivery; data analytics processing; transaction processing; and an application relocated from a remote device.

The above embodiments and examples of managing inputs from multiple users are not meant to be limiting. A variety of methods for managing inputs and usage of a virtual application are contemplated and considered in the scope of the invention.

Exemplary embodiments have been described in the context of a fully functional system for relocating an application from a remote electronic device to a virtualization-based environment and managing the inputs from and outputs to one or more remote electronic devices once relocated. Readers of skill in the art will recognize, however, that embodiments also can include a computer program product disposed upon computer-readable storage medium or media (or machine-readable storage medium or media) for use with any suitable data processing system or storage system. The computer readable storage media can be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer or storage system having suitable programming means will be capable of executing the steps of a method disclosed herein as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the claims.

As will be appreciated by one skilled in the art, aspects can be embodied as a system, method, or computer program product. Accordingly, aspects can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, aspects can take the form of a computer program product embodied in one or more computer readable medium(s) having computer readable program code embodied thereon.

Any combination of one or more computer readable medium(s) can be used. The computer readable medium can be a computer-readable signal medium or a computer-readable storage medium. The computer readable signal medium or a computer readable storage medium can be a non-transitory medium in an embodiment. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electro-magnetic, optical, or any suitable combination thereof. A computer readable signal medium can be any computer readable medium that is not a computer readable storage medium and that can communicate, propagate, or transport a program for use by or in connection with an instruction execution system, apparatus, or device.

Program code embodied on a computer readable medium can be transmitted using any appropriate medium, including but not limited to wireless, wire, optical fiber cable, RF, etc., or any suitable combination of the foregoing.

Computer program code for carrying out operations for aspects can be written in any combination of one or more programming languages, including an object-oriented programming language such as Java™, Smalltalk™, C++ or the like and conventional procedural programming languages, such as the C programming language or similar programming languages. The program code can execute entirely on the user's computer, partly on the user's computer, as a stand-alone software package, or on one module or on two or more modules of a storage system. The program code can execute partly on a user's computer or one module and partly on a remote computer or another module, or entirely on the remote computer or server or other module. In the latter scenario, the remote computer other module can be connected to the user's computer through any type of network, including a local area network (LAN) or a wide area network (WAN), or the connection can be made to an external computer (for example, through the Internet using an Internet Service Provider).

Aspects are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instructions which implement the function or act specified in the flowchart, or block diagram block or blocks.

The computer program instructions can also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions or acts specified in the flowchart, or block diagram block or blocks.

The flowchart and block diagrams in the Figures illustrate the architecture, functionality, and operation of possible implementations of systems, methods and computer program products according to various embodiments. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terms "server" and "mobile client" are used herein for convenience only, and in various embodiments a computer system that operates as a mobile client computer in one environment can operate as a server computer in another environment, and vice versa. The mechanisms and apparatus of embodiments of the present invention apply equally to any appropriate computing system, including a computer system that does not employ the mobile client-server model.

While this disclosure has described the details of various embodiments shown in the drawings, these details are not intended to limit the scope of the invention as claimed in the appended claims.

What is claimed is:

1. A computer-implemented method for placement of a plurality of virtual machines, comprising:
    assigning, to a hardware resource, a plurality of candidate virtual machines selected from the plurality of virtual machines, wherein a candidate virtual machine is a virtual machine that uses performance resources of the hardware resource beyond performance resources available on the hardware resource;
    generating a user location vector for each candidate virtual machine from the plurality of candidate virtual machines by aggregating a plurality of user location metrics for the candidate virtual machine, the user location vector represents an aggregate of a velocity, and direction of movement for a plurality of users on the candidate virtual machine, wherein aggregating the user location metric includes:
        identifying the plurality of users of the candidate virtual machine from the plurality of candidate virtual machines based upon a usage of the particular candidate virtual machine,
        determining a velocity and direction of movement for each user from the plurality of users, and
        aggregating the velocity and direction of movement for the plurality of users of the candidate virtual machine;
    ranking, in response to a performance resource demanded by the plurality of candidate virtual machines being at or above a threshold of the performance resource available on the hardware resource, the plurality of candidate virtual machines as a function of an aggregate user location vector for each candidate virtual machine;
    selecting a subset of the candidate virtual machines for migration based on the ranking; and
    migrating, responsive to the selecting, the subset of candidate virtual machines to the hardware resource.

2. The computer-implemented method of claim 1, wherein determining a user location metric includes:
    selecting the user location metric in response to an expected impact on performance of the hardware resource for the user location metric; and
    measuring a selected user location metric.

3. The computer-implemented method of claim 1, wherein aggregating the user location metric includes using a weight for one or more user location metrics, with each weight defined by a virtual machine profile that is a collection of all the preferences for a user, wherein the weight for each user location metric differs between virtual machine profiles.

4. The computer-implemented method of claim 3, wherein a first user that frequently accesses the candidate virtual machine has a higher weight associated with a user location metric than a second user that infrequently accesses the candidate virtual machine.

5. The computer-implemented method of claim 3, wherein the weight differs depending on a historical location for the user.

* * * * *